United States Patent [19]

Kinney

[11] 3,991,217

[45] Nov. 9, 1976

[54] PRODUCTION OF A PATTERNED PRODUCT

[75] Inventor: Alfred W. Kinney, Kansas City, Mo.

[73] Assignee: Phillips Petroleum Company, Bartlesville, Okla.

[22] Filed: Dec. 30, 1974

[21] Appl. No.: 537,463

[52] U.S. Cl. .............................. 426/249; 426/565
[51] Int. Cl.² ........................................ A23G 9/00
[58] Field of Search ..................... 426/101, 249, 565

[56] References Cited
UNITED STATES PATENTS

| | | | |
|---|---|---|---|
| 1,968,183 | 7/1934 | Vogt | 426/249 |
| 2,334,052 | 11/1943 | Wedin | 426/249 |
| 2,858,217 | 10/1958 | Benson | 426/249 |

Primary Examiner—Jeanette M. Hunter

[57] ABSTRACT

Production of a patterned product is accomplished by forming a plurality of product streams into a patterned product stream having a desired cross sectional pattern or configuration, then dispensing the patterned product stream into a product container. The cross sectional pattern of the packaged product is substantially the same as the cross section of the patterned product stream even though the diameter of the container may be substantially greater than the diameter of the patterned product stream dispensed into it.

7 Claims, 10 Drawing Figures

PRODUCTION OF A PATTERNED PRODUCT

This invention relates to a method and apparatus for producing a patterned product. In another aspect the invention relates to a method and apparatus for filling a container with a patterned product. In still another aspect the invention relates to a method and apparatus for producing a product having a generally circular cross section and a distinctive cross sectional pattern. In another aspect the invention relates to producing a patterned ice cream product. In yet another aspect the invention relates to a patterned product.

In the production of a product wherein it is desired to package two or more varieties, flavors, or colors of a generally similar product in a single container, it is desirable to provide a filling method and apparatus which is as efficient and versatile as possible. One previously known method of making products such as Neapolitan ice cream is sequentially separately introducing the different flavored layers into a container. This method requires as many different filling operations as there will be layers within the package and also has the disadvantage of permitting access to the various layers within the container only when the container is adapted to be opened on a side oriented at a generally right angle from the side through which the container was filled.

A method of filling containers with a layered product where filling of the container and the removal of the product by the consumer is accomplished through the same opening in the container is to bring each product variety into a filling head of substantially the same cross sectional shape and area as that of the container to be filled, inserting the filling head into the container until it touches the container bottom, and lowering the container as product is released into it. This procedure requires a different filling head for each differently sized or shaped container and, in addition, the manual or mechanical labor required to lift the container, lower it as the container is being filled, push the container sideways at a fast rate of speed to wipe off the product even with the top of the container, and properly position another container under the filling nozzle is extremely difficult to accomplish accurately and consistently. This is particularly true in view of the fact that such nozzles are generally not equipped with any kind of valve means and the product continues to flow from the nozzle at all times since the freezing machines which produce ice cream are ordinarily continuously operated and require that the product therefrom be continuously removed in order to avoid damage to the machine. Wiping the container across the end of the nozzle while the product is still flowing therefrom also tends to cause a void at the leading edge of the container resulting from the pull of the product due to its inherent viscosity. This effect also creates a succeeding slug of product which is not flat on the end but rather has an angle at the bottom edge thereof, tending to create a void at the bottom of the succeeding container.

It is therefore an object of the invention to provide a method and apparatus for producing a patterned product. Another object of the invention is to provide a method and apparatus for filling a container with a patterned product. Yet another object of the invention is to provide a method and apparatus for producing a patterned product having a generally circular cross section. Another object of the invention is to provide a method and apparatus for producing a patterned ice cream product. Still another object of the invention is to provide a method and apparatus for filling a container with a patterned product. Another object of the invention is to provide a new and useful patterned product.

In accordance with the invention various product streams, one for each layer or pattern segment in the desired product pattern are delivered to a patterning means wherein the various individually identifiable product streams are combined into a patterned product stream having a desired distinctive cross sectional pattern. The patterned product stream is then delivered to a dispensing means which in turn delivers the patterned product stream into a container. A flow interruption means within the dispensing means provides for momentary interruption of the patterned product stream while an additional container is being moved into position beneath the dispensing means, but does not disrupt the desired cross sectional pattern of the product. Momentary interruption of the product flow can be accomplished even though the individual product streams are continuously produced since, in accordance with the invention, the period of time during which interruption is required is shortened due to the absence of a requirement that the container into which the product will be deposited be elevated to bring the container bottom to a position adjacent a dispensing nozzle.

In accordance with the invention the container to be filled can be a variety of sizes and can have a cross sectional area of from equal to, up to many times larger than, the cross-sectional area of the dispensing means outlet.

In addition, the method and apparatus of the invention can be utilized to produce a novel and useful product configuration in which a plurality of wedge-shaped container sectors can each be filled with a separate distinctive product.

Other objects and advantages of the invention will be apparent from the accompanying specification and claims and from the drawing in which:

Figure 1:
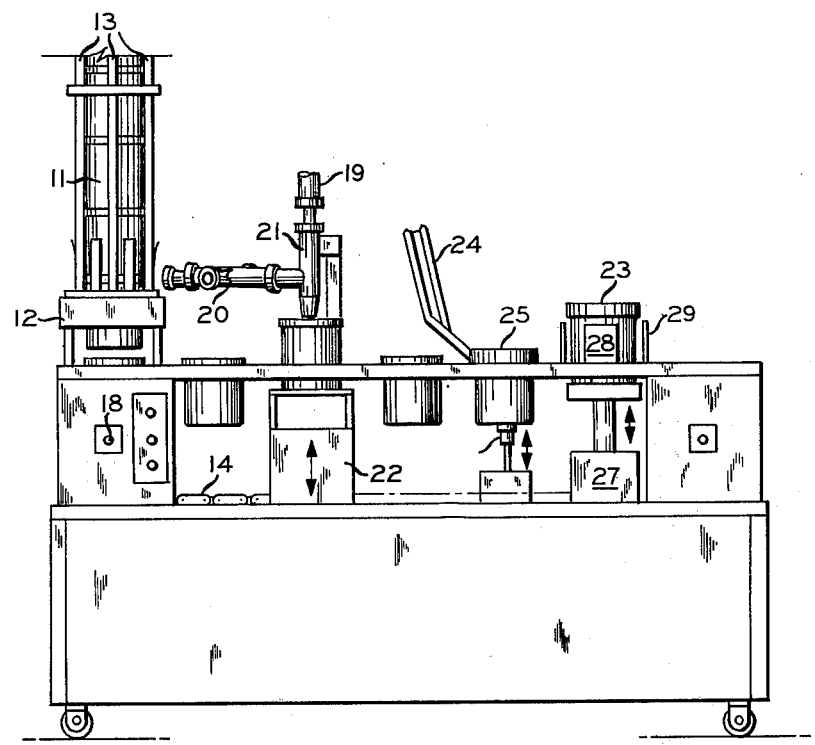
FIG. 1 is a front elevational view of a packaging system which is compatible with the method and apparatus of the invention.

Referring now to FIG. 1, a nested stack of containers 11 is supported by a container dispensing mechanism 12 and six vertical guide rods 13 over the upper run of an endless conveyor 14. The conveyor 14 is indexed in a stepwise manner by a drive axle 18. During the dwell portion of each step or cycle, the dispensing mechanism 12 separates the lowermost container 11 from the stack and drops the separated container into a container support which is positioned on the conveyor 14 below the dispensing mechanism 12. A patterning means 20 combines a plurality of ingredients and carries them to a dispensing mechanism 21. The dispensing mechanism 21 is actuated during the dwell portion of each cycle by an actuating means 19 to introduce the material to be packaged into the container 11 positioned in the filling station of the conveyor. If desired, a container lift mechanism 22 can be employed to raise the container 11 to be filled so that the outlet end of the dispensing means 21 is at a desired location relative to and coaxial with the container opening before the dispensing mechanism 21 is actuated. When the preferred patterning means 20 and dispensing means 21 are utilized, the lift mechanism 22 can be actuated to bring the top of the container 11 to approximately the same level as the outlet of the dispensing mechanism 21 for filling. Selection of an appropriate height for the dispensing mechanism 21 can therefore result in very little time being utilized by the lift mechanism 22 to raise a container 11 to the desired height following each indexing step of the conveyor 14. The lift mechanism 22 can also be used to compensate for changes in container height with a minimum of machine adjustment when containers having a different upper rim thickness are to be filled.

Closures 23 are fed into a chute 24, the lower end of which is positioned over the conveyor 14, in such a manner that the leading edge of the lowermost closure within the chute 24 is contacted by the leading edge of the rim of the container 11 as the conveyor 14 indexes the filled container into the capping station. The forward motion of the container 11 draws the engaged closure 23 from the chute 24, while the contact of the upper surface of the closure 23 with a horizontal plate 25 forces the closure 23 down on to the rim of the container 11. If desired, a container marking mechanism 26 can be actuated during the dwell portion of each cycle to raise the container 11 and the associated closure 23 into firm contact with the plate 25 to firmly seal the closure 23 onto the container 11 and to apply indicia to the bottom of the container. During the dwell portion of each cycle, a lift mechanism 27 is actuated to raise the filled and capped container which is in the transfer station of the conveyor 14 to a position above the conveyor. A transfer mechanism 28 is then actuated to move the elevated container laterally of the conveyor 14 and into an output chute 29.

Figure 2:
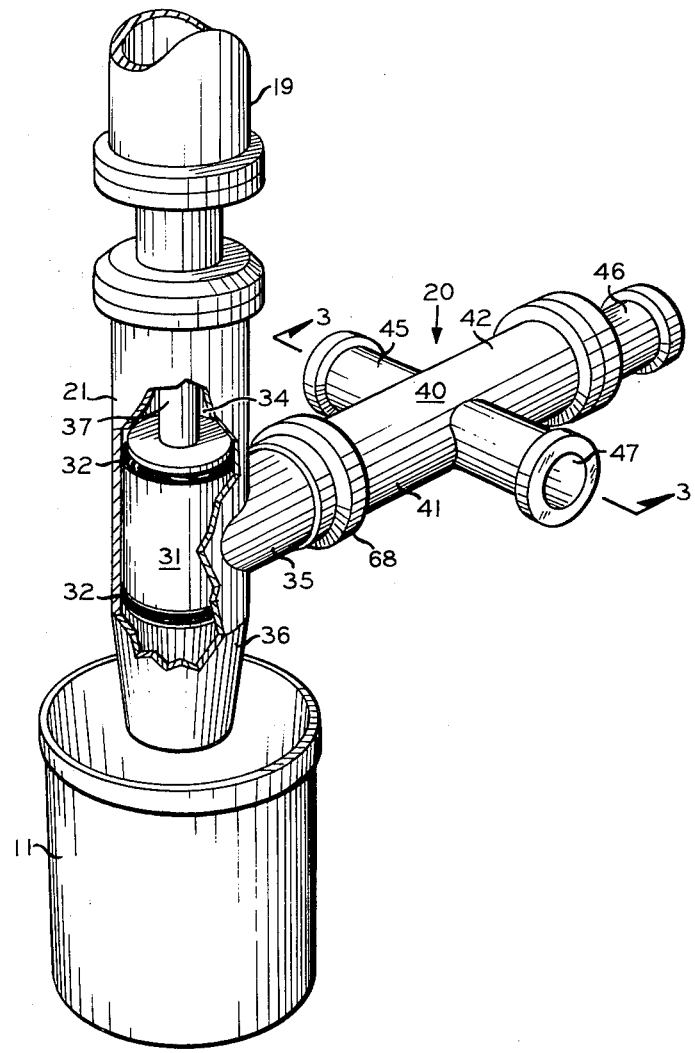
FIG. 2 is a partially cutaway isometric view of the patterning means and dispensing means of the invention.

In FIG. 2 the body of the dispensing means 21 has been partially cut away to show a movable piston 31 mated to and positioned within the cylindrical inner surface of the dispensing means 21. Flow of product within the dispensing means 21 past the piston 31 is precluded by both fitting the piston 31 to match the inner contour of the dispensing means 21 and by providing additional sealing means such as the illustrated O-rings 32 at each end of the piston 31.

The dispensing means 21 has a main body portion 34 within which the piston 31 is located, an inlet conduit 35 through which material to be dispensed is carried to the main body 34, and a tapered outlet portion 36 through which the material to be dispensed is directed into a container 11. The tapered outlet portion 36 of the dispensing means 21 is preferably an extension of the main body portion 34 thereof. The central axis of the inlet conduit 35 is angularly disposed with respect to the central axis of the main body portion 34 of the dispensing means 21 so that the action of the piston 31 can be used to momentarily seal off the opening of the inlet conduit 35 into the main body portion 34 of the dispensing means 21. Although any angle which will accomplish this purpose can be utilized, in the preferred embodiment illustrated the central longitudinal axis of the inlet conduit 35 is at an angle of about 90° to the central longitudinal axis of the main body 34 and outlet portion 36 of the dispensing means 21.

A piston rod 37 is powered by the actuating means 19. The actuating means 19 can be any double acting cylinder operated by electric, pneumatic, hydraulic, or other similar means to drive the piston rod 37 and piston 31 in either direction within the main body 34 of the dispensing means 21. In FIG. 2 the piston 31 is shown in its lowermost position. In this position product communication between the inlet conduit 35 and the outlet portion 36 of the dispensing means 21 is effectively stopped while an additional container 11 is positioned beneath the dispensing means 21. After momentarily interrupting the flow of product through the dispensing means 21 for a period of time sufficient to permit the positioning of the next container 11, the piston 31 is raised by the piston rod 37 to an elevated position so that free product communication from the inlet conduit 35 to the outlet portion 36 of the dispensing means 21 is again established. Although the position of the container 11 beneath the dispensing means 21 can be varied to achieve desired product effects, it is preferred that the container 11 be located in a coaxial relationship with the main body 34 and outlet portion 36 of the dispensing means 21 so that the product is directed as nearly as possible into the center of the container 11.

The patterning means 20 comprises a main body member 40 which has a downstream outlet portion 41 and an upstream inlet portion 42. The downstream outlet portion 41 of the patterning means communicates with the inlet conduit 35 of the dispensing means 21 to provide a flow of patterned product to the dispensing means 21. Although the downstream portion 41 can be of any suitable length, it preferably has a length from the downstream side of the product inlet nearest the downstream end of the patterning means to the downstream end of the patterning means at least equal to, and preferably in excess of, its diameter. A plurality of product inlet conduits 45, 46, 47 communicate with the upstream portion 42 of the patterning means 20 in order to provide a flow of various distinctive product materials to the patterning means 20. Although the preferred embodiment illustrated has three product inlet conduits, the method and apparatus of the invention are adaptable to utilize any number of two or more such inlet conduits each supplying a product of generally like consistency and temperature, for example, different flavors of ice cream. Within the patterning means 20 the plurality of product streams are oriented to form a desired pattern prior to being released into the inlet conduit 35 of the dispensing means 21. A variety of different pattern configurations and product orienting means can be used in conjunction with the patterning means 20. FIGS. 3–10 illustrate two preferred product orienting means and the products which are produced when each is utilized in conjunction with the illustrated patterning means 20 and dispensing means 21. Unlike previously known patterning and filling devices, there is no requirement that the patterning means also act as an accumulator for the product while an additional container is brought into position to be filled. The cross-sectional area of the patterning means 20 can therefore be equal to or less than the total cross-sectional areas of the various product conduits 45, 46, 47 which supply products to it. Use of the illustrated apparatus also permits the patterning means 20 to have a cross-sectional area substantially less than the cross-sectional area of the container 11.

Figure 3:
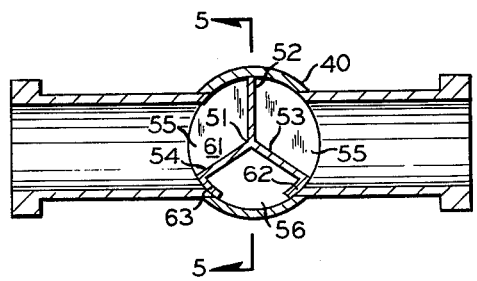
FIG. 3 is a sectional view along section 3—3 of FIG. 2.

FIG. 3 illustrates a cross section of the patterning means 20 incorporating a preferred apparatus and method for producing a patterned product wherein each of three product constituents comprises a wedge-shaped portion of the final packaged product. A pattern insert 51 having three product dividers 52, 53, 54 extending substantially the entire length of the main body 40 of the patterning means 20 divides the main body 40 into a plurality of pattern conduits 55, 56, 57. The pattern conduits 55, 56, 57 are each supplied with a distinctive product stream by respective products conduits 45, 46, 47. Although communication among the various product streams entering the patterning means 20 can be prevented by any suitable means, a preferred means which is adaptable for use when a variety of inserts such as the insert 51 are to be utilized with a single patterning means 20 is to provide the insert 51 with blocking plates 61, 62, 63 which prevent communication of each product conduit with more than one pattern conduit. Selection of product conduits 45, 46, 47 with suitably adapted sizes, shapes, and/or orientations could obviously be utilized in lieu of the blocking plates 61, 62, 63 at the expense of some degree of versatility of the patterning means 20. When a plurality of distinctive products are provided to the product conduits 45, 46, 47 of a patterning means 20 equipped with the illustrated insert 51, each product fills its respective pattern conduit 55, 56, 57 and flows toward the viewer of FIG. 3 downstream through the outlet portion 41 of the patterning means 20, thereby establishing a patterned product flow from the outlet of the patterning means 20 in which the individual distinctive product constituents assume the relationship one to another dictated by the shape of the insert 51. Although the sectors of the cross section of the main body 40 of the patterning means 20 defined by pattern conduits 55, 56, 57 can be of any relative size, a preferred embodiment is one in which each pattern conduit has a substantially equal cross-sectional area with a substantially equal angle, about 120° in the embodiment illustrated, between adjacent product dividers 52, 53, 54.

Figure 4:
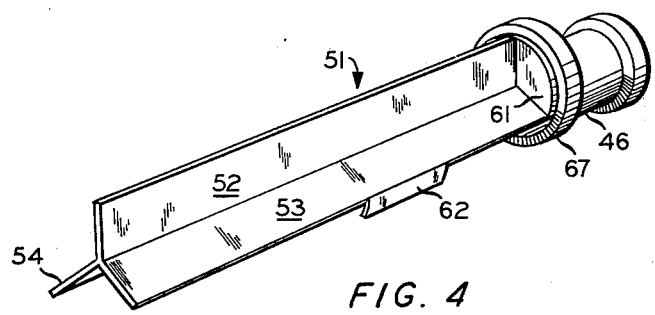
FIG. 4 is an isometric view of the patterning chamber insert utilized to produce the patterning chamber configuration illustrated in FIG. 3.

In FIG. 4 the product insert 51 is illustrated removed from the main body 40 of the patterning means 20. Although the insert 51 can be separate from the product conduit 46, the product conduit 46 is preferably attached to the blocking plate 61 of the insert 51, thereby insuring a seal which prevents flow of material from the product conduit 46 into the area between dividers 52 and 53 or the area between dividers 52 and 54 while permitting flow into the area between dividers 53 and 54. The insert 51 is also provided with a flange 67 which is adapted to mate with the upstream end of the upstream portion 42 of the patterning means 20. The flange 67 and upstream end of the main body 40 of the patterning means 21 can be adapted to preclude rotation of the insert 51 within the patterning means 20 by any suitable means.

Figure 5:
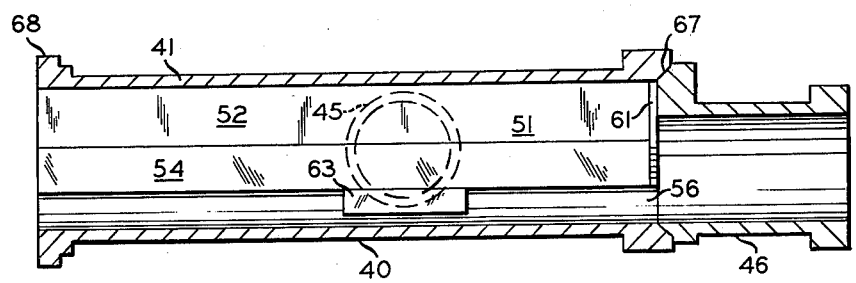
FIG. 5 is a sectional view along section 5—5 of FIG. 3.

In FIG. 5 the relationship of the insert 51 with the patterning means 20 is further illustrated. Communication between the interior of the product conduit 46 and the pattern conduit 56 is permitted while the blocking plate 61 prevents communication with other pattern conduits. Likewise, communication between the interior of the product conduit 45 and its associated conduit 55, located behind partitions 52 and 54 of the insert 51, is permitted while the blocking plate 63 precludes communication of the product conduit 45 with other pattern conduits. In a similar manner, partition 52 and 53 along with blocking plate 62 permit communication of product conduit 47 with only pattern conduit 57. The dividers 52, 53, 54 defining pattern conduits 55, 56, 57 terminate at the downstream end of the downstream portion 41 of the patterning means 20. The downstream end 41 of the patterning means 20 can be fitted wth any suitable attachment means 68 adapted to mate with and to be engaged to the inlet conduit 35 of the dispensing means 21.

Figure 6:
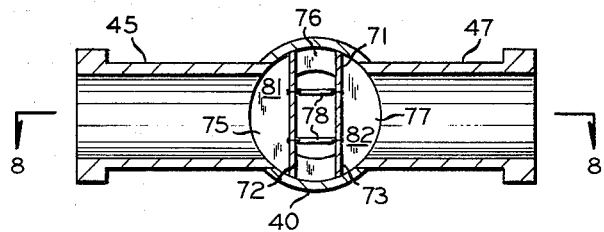
FIG. 6 is a cross sectional view of a second patterning chamber configuration viewed along the same plane as FIG. 3.

FIG. 6 illustrates the use of another preferred pattern insert 71 which can be employed in conjunction with the patterning means 20 to produce a product having a layered distribution of distinctive product constituents. The insert 71 comprises two dividing means 72, 73 which divide the main body 40 of the patterning means 20 into a plurality of pattern conduits 75, 76, 77 communicating with respective product conduits 45, 46', 47. In cross section, the dividing means 72, 73 are generally defined by parallel chords of the circular patterning means cross section in the preferred embodiment illustrated. One or more bracing members 78 can be utilized to maintain the proper spacing between the dividers 72, 73 along the length of the main body 40 of the patterning means 20. Although communication of each product conduit 45, 46', 47 with only its respective pattern conduit 75, 76, 77 can be insured by choosing product conduits 45, 46', 47 having specific sizes, areas, cross-sectional shapes, and/or locations, a preferred method of preventing communication of the product conduit 46' with pattern conduits 75 and 77 is the utilization of blocking plates 81 and 82. The blocking plates 81, 82 effectively prevent communication of the product conduit 46' with pattern conduits 75 and 77 while the dividing members 72 and 73 permit communication of the product conduits 45, 47 with only their respective pattern conduits 75, 77. When the separate product streams are introduced through the product conduits 45, 46', 47 they are directed through respective pattern conduits 75, 76, 77 toward the viewer of FIG. 6 downstream through the patterning means 20 to the outlet thereof to establish a patterned product stream having the distinctive pattern dictated by the location of dividers 72 and 73 within the main body 40 of the patterning means 20. Although the pattern conduits can be of any relative size, in a preferred embodiment, each pattern conduit 75, 76, 77 is of substantially equal cross-sectional area.

Figure 7:
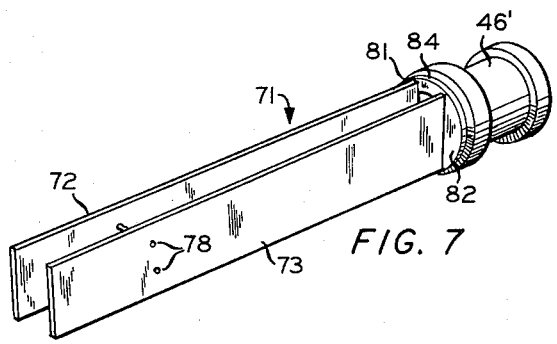
FIG. 7 is an isometric view of the patterning chamber insert utilized to produce the patterning chamber configuration illustrated by FIG. 6.

FIG. 7 illustrates a patterning insert 71 which has been removed from the main body 40 of the patterning means 20. Although the product conduit 46' can be separate from the insert 71, the preferred insert 71 has an associated product conduit 46' attached to the blocking plates 81, 82 thereof to form a single unit. The product conduit 46' preferably has a beveled or flanged surface 84 which mates with a surface at the inlet end of the main body 40 of the patterning means 20. The beveled or flanged portion 84 and the mating surface of the patterning means 20 can be provided with means such as a clamp or key to prevent rotation of the insert 71 within the main body 40 of the patterning means 20. The bracing means 78 associated with the dividing partition 72, 73 can be spaced at any suitable distance downstream from the attachment of the partition 72, 73 with the product conduit 46' to insure the desired uniform separation between the partition 72, 73 throughout their entire length.

Figure 8:
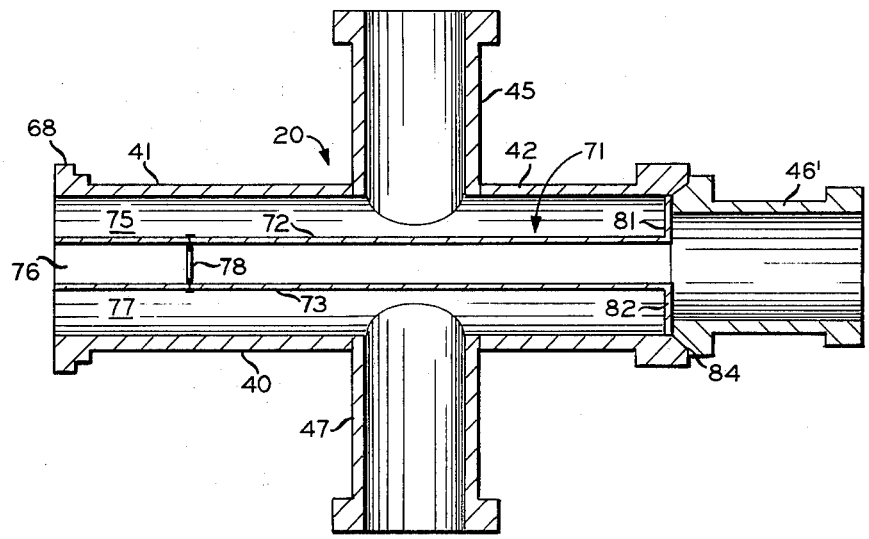
FIG. 8 is a cross sectional view along section 8—8 of FIG. 6.

FIG. 8 further illustrates the use of the pattern insert 71 as a part of the patterning means 20. The dividing partitions 72, 73 segregate the main body 40 of the patterning means 20 into pattern conduits 75, 76, 77 which communicate solely with their respective product conduits 45, 46', 47. The dividing partitions 72, 73 extend substantially the entire length of the main body 40 of the patterning means 20 to the downstream end of the downstream portion 41 thereof.

Although any suitable patterning means 20 can be utilized to produce a patterned product stream which can be accepted and dispensed by the dispensing means 21, the embodiment illustrated in FIGS. 3, 5, 6, and 7 is preferred for its ease of construction and ability to accept a variety of pattern inserts. In accordance with the invention a plurality of distinctive or differently colored but similar products, each having a similar density, viscosity, and temperature, are supplied to the plurality of product conduits of the patterning means by any suitable means such as one or more ice cream freezing machines or other product supply means. The plurality of product streams is thence formed into a single patterned product stream of a cross-sectional pattern or configuration determined by the pattern insert or other internal construction of the patterning means. The patterned product stream from the outlet of the patterning means is accepted by the inlet conduit of the dispensing means which is preferably of the same cross sectional shape and area as the patterning means outlet.

Within the dispensing means the patterned product stream is conveyed from the inlet conduit to a main body portion, preferably having substantially the same cross sectional shape and area as the inlet conduit, which in turn provides for flow of the patterned product stream to an outlet portion thereof. Although the outlet portion of the dispensing means can be untapered, use of a gently tapered outlet portion wherein the outlet walls taper inwardly at an angle of about 5°, for example, to decrease the outlet opening of the dispensing means to about ¾ the diameter of the main body is preferred for the purpose of increasing the flow rate of product from the dispensing means without disrupting the distinctive product pattern. In a preferred embodiment, the passageway through the dispensing means has a cross sectional area no greater than the cross-sectional area of the patterning means.

The flow of product from the dispensing means is periodically interrupted by the downward movement of the piston within the main body of the dispensing means to prevent communication between the inlet conduit and main body of the dispensing means. The speed with which the piston is lowered is preferably substantially greater than the speed at which product is flowing through the dispensing means so that the final amount of product placed into a container is deposited with a burst of downward velocity which tends to level the product within the container or, if desired, to leave a small mound of material within the middle of the container to provide a desirably firm contact between the top surface of the packaged product and, for example, a transparent window within the container cover.

A particular advantage of the disclosed method and apparatus is the ability to produce a product having a uniform distinctive cross sectional configuration as determined by the patterning means, even though after the pattern is established within the product the patterned stream traverses the angular change of direction between the inlet and the main body of the dispensing means, is periodically interrupted by the action of the piston within the dispensing means, and is injected into a container having a diameter substantially in excess, about four times, for example, of the diameter of the outlet of the dispensing means. Filling of a container having either straight or tapered sidewalls can be best accomplished by injecting the product from the dispensing means directly into the center of the container at a high rate of speed. As the product expands outwardly upon reaching the bottom of the container or upon reaching the product level within the container, such expansion is uniform across the cross section of the product stream, thereby maintaining the distinctive patterned product cross section.

The method and apparatus of the invention are useful in packaging any material having sufficient viscosity to be placed within a container with a similar material without substantial mixing of the two materials, yet being sufficiently plastic to be shaped to a desired pattern configuration. Such materials include, but are not limited to, ice cream, yogurt, cottage cheese, puddings, peanut butter, pastry dough, partially frozen or solidified liquids, pseudo-plastic materials, thixotropic fluids, solid particulate materials, finely divided solid materials, and the like. The invention is particularly useful in the packaging of semi-frozen products prepared by freezing, while stirring, a mixture comprising a dairy product and flavoring additives. Such products include, but are not limited to, ice cream, ice milk, sherbet, and the like. Such materials will be preferably slightly compressible due to either the nature of the material itself or to the incorporation within the material of an amount of compressible material, such as air in the case of many semi-frozen products.

Figure 9:
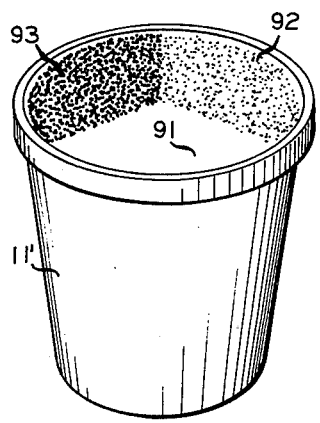
FIG. 9 is an isometric view of a container filled with the product produced utilizing the patterning means of FIGS. 3, 4, and 5.
Figure 10:
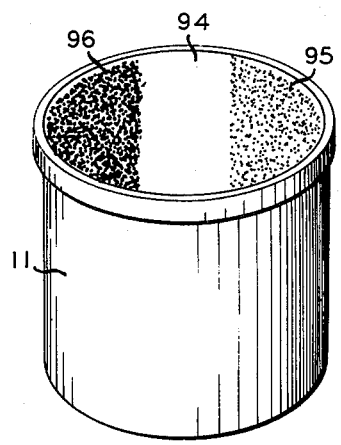
FIG. 10 is an isometric view of a container filled with the product resulting from the use of the patterning means illustrated in FIGS. 6, 7, and 8.

FIGS. 9 and 10 illustrate the respective packaged product configurations which can be obtained utilizing the pattern inserts of FIGS. 4 and 7 respectively in conjunction with the patterning means 20. In FIG. 9 a container 11', filled utilizing the method and apparatus of the invention, contains a first product 91, a second product 92, and a third product 93. The plurality of individual products 91, 92, 93 are positioned within the container in accordance with the pattern established by the patterning means 20 utilizing the pattern insert 51. Each of the individual products occupies a sector of the circular cross section within the container 11'. The pattern of the individual products is maintained throughout the depth of the container without significant mixing of the individual distinctive product materials 91, 92, 93. Distribution of a plurality of products within the container 11' as illustrated by FIG. 9 wherein each individual product constituent occupies a sector of a generally cylindrical or frustoconical container 11' is particularly useful since it permits greater versatility in dispensing the packaged product from the container 11'. When there are three individual products 91, 92, 93 as illustrated in FIG. 9 the individual dispensing or serving the product from the container 11' is able, using a single ice cream scoop or other serving instrument, to remove a single scoop of any of the three individual product constituents, a single scoop containing a combination of any two of the single product constituents, or a single scoop containing all three of the product constituent, depending upon the location from within the container at which the product is removed. Although this product configuration is especially preferred for use in conjunction with the packaging of ice cream, other products can be similarly packaged and served. A particularly preferred product configuration is one in which each of the product sectors occupies a substantially equal cross sectional area within the cross section of the container and a substantially equal volume within the container 11 and wherein the individual products 91, 92, 93 comprise vanilla ice cream, strawberry ice cream, and chocolate ice cream, respectively.

FIG. 10 illustrates a container 11 filled with individual product constituents 94, 95, and 96 in a layered pattern produced by utilizing the pattern insert 71 in conjunction with the patterning means 20. Each of the product layers maintains a substantially vertical interface with the adjacent layer throughout the depth of the container 11 without significant mixing. Although additional layers and other products can be produced in accordance with the invention, a preferred product is one in which the individual product constituents 94, 95, and 96 comprise vanilla ice cream, strawberry ice cream, and chocolate ice cream, respectively, and in which the total volume of each individual product within the container is substantially equal.

While the specific embodiments of the invention described herein are particularly useful, many modifications to the method and apparatus of the invention can be made without departing from the spirit and scope thereof. For example, a substantial number of patterning insert configurations could be utilized along with variation in the configuration of the upstream inlet portion 42 of the patterning means 20 to produce a nearly unlimited number of different patterns for use with nearly any combination of two or more distinctive products. Likewise, the cross sectional shape of the downstream outlet portion 41 of the patterning means 20 and of the inlet conduit 35, main body 34, and outlet portion 36 of the dispensing means 21 can be altered to facilitate filling of containers having various cross sectional shapes or modification of the pattern established by the patterning means 20 as desired. Other reasonable variations and modifications by those skilled in the art are possible within the scope of the foregoing description of the invention and the appended claims thereto.

What is claimed is:

1. A method for forming a patterned product, said method comprising the steps of:
   continuously passing a plurality of product streams, each having a similar viscosity, to a patterning means;
   combining said product streams into a single patterned product stream having a desired cross sectional pattern within said patterning means;
   delivering said patterned product stream from said patterning means into a dispensing means;
   periodically interrupting the flow of said patterned product stream through said dispensing means; and
   dispensing increments of said patterned product stream from an outlet of said dispensing means to form a patterned product having substantially the same cross sectional pattern as said patterned product stream.

2. A method in accordance with claim 1 wherein dispensing increments of said patterned product stream comprises dispensing said patterned product stream into a container having a cross sectional area substantially greater than the cross sectional area of the outlet of said dispensing means.

3. A method in accordance with claim 2 additionally comprising momentarily accelerating the rate at which said patterned product stream is dispensed from said dispensing means simultaneously with the step of interrupting the flow of said patterned material from said dispensing means.

4. A patterned product produced by the process of claim 1 comprising a plurality of individually identifiable sections of similar, generally plastic, basic compositions distributed within a container of generally circular cross section so that each said identifiable sections occupies a space within the container defined by extension of a sector of the container cross section along the length of the container.

5. A product in accordance with claim 4 wherein said individually identifiable sections comprise differently colored frozen dairy products.

6. A product in accordance with claim 4 wherein there are three said individually identifiable sections each occupying substantially one third of the volume of said container.

7. A product in accordance with claim 6 wherein said three identifiable sections are chocolate flavored, strawberry flavored, and vanilla flavored ice cream.

* * * * *